April 12, 1966   EIICHI TANAKA ETAL   3,246,151
LOW BACKGROUND BETA-RAY SCINTILLATION SPECTROMETER
Filed Feb. 27, 1962
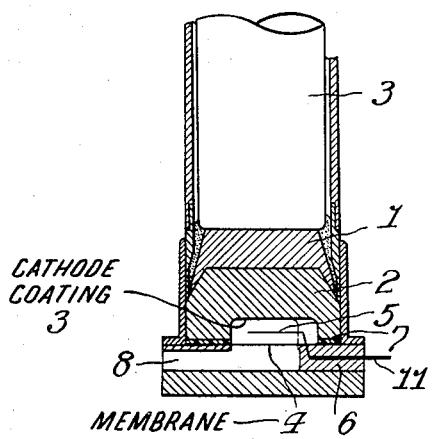
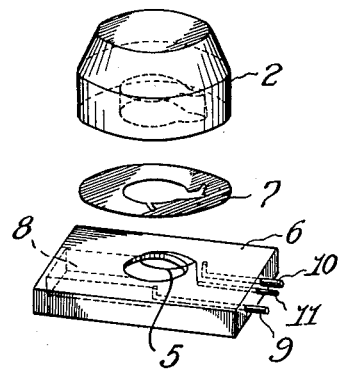
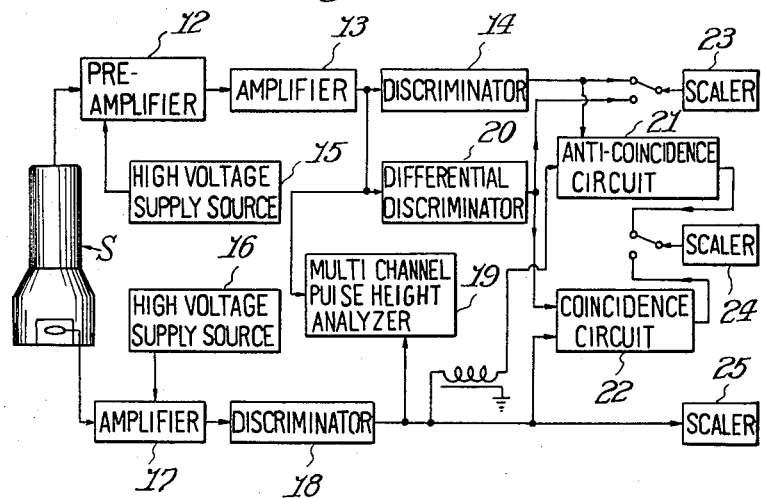

United States Patent Office 3,246,151
Patented Apr. 12, 1966

3,246,151
LOW BACKGROUND BETA-RAY SCINTILLATION SPECTROMETER
Eiichi Tanaka, Tokyo-to, and Tosiyuki Hiramoto, Chiba-shi, Japan, assignors to Hoshasen Igaku Sogo Kenkyu-sho, Kurosuna-cho, Chiba-shi, Japan
Filed Feb. 27, 1962, Ser. No. 176,049
Claims priority, application Japan, Mar. 6, 1961, 36/7,606
6 Claims. (Cl. 250—71.5)

The present invention relates to a low background $\beta$-ray scintillation spectrometer and more particularly to a new and improved type of $\beta$-ray scintillation spectrometer suitable for measuring very low $\beta$-ray activities of solid.

Minimizing of the background events is an important part of successful low level counting. Heretofore, as a low level counting system, there has been proposed a system wherein a Geiger-Mueller counter (which will be called a G-M counter in this specification) is shielded by iron or lead or mercury as a $\gamma$-ray shield, and an anti-coincidence Geiger counter is used to eliminate penetrating cosmic ray events of high specific ionization (principally $\mu$ mesons). However, in measuring $\beta$-ray energy by this system, there is no practical method except that of obtaining an absorption curve representing the realtion between the counting rates obtained by using absorber of various thickness and thickness of said absorber, but this practical method is not only very troublesome but also time-consuming for measurements and is practically impossible in the case of extremely low level counting because of the reduction of counting rate due to the $\beta$-ray absorption by the absorber.

On one hand, a method of $\beta$-ray spectrometry is that wherein a scintillation counter using an organic scintillator is the detector, is used, and the pulse height of the output signal of said detector is analysed by a multi-channel pulse height analyzer, but this detector has a relatively high back-ground because of its high efficiency for environmental $\gamma$-radiations, so that it cannot be used in low level counting.

It is an essential object of the present invention to provide a new and improved low background $\beta$-ray scintillation spectrometer having none of the above-mentioned disadvantages and having only the advantages of the above-mentioned methods.

According to this invention, it is made possible to measure energy distribution of $\beta$-rays or to count $\beta$-rays having a certain energy level range in the state of extremely low level background.

The above object and other objects of this invention have been attained by a low background $\beta$-ray scintillation spectrometer for counting and energy analysis of $\beta$-rays which comprises a detector consisting of a scintillation counter for $\beta$-rays having a phosphor provided with a hollow which is made to act as a G-M counter, whereby said analysis and counting are made to be carried out in the state of reduced background. The details of the invention and its principle as well as the manner in which the objects and advantages of the present invention may best be achieved will be understood more fully from a consideration of the following description, taken in conjunction with the accompanying drawings, in which the same or equivalent parts are designated by the same reference numerals or letters, and in which:

FIG. 1 is a partial elevational view, in vertical section, of a detector according to this invention;

FIG. 2 is an exploded perspective view of the main parts of the detector of FIG. 1; and FIG. 3 is a block diagram of the electronic circuitry.

Referring to FIGS. 1 and 2, the detector comprises such a phosphor for $\beta$-rays as a plastic scintillator 2, a photomultiplier tube 3, and a Lucite light pipe 1, said members forming a scintillation spectrometer. The plastic scintillator 2 has a hollow at its lower face. The inner surface of said hollow, coated with an electroconductive material 3 such as aluminum, for example, by vacuum evaporation, acts as a cathode of a Q-gas flow G-M counter. This G-M counter is provided with an anode 5 which can be made of a horizontal loop of stainless steel wire of 0.05 mm. diameter. A membrane 4 forms a window of the G-M counter. Said membrane 4 may be, for example, made of a gold plated Mylar film of 1.3 mg./cm.$^2$ thickness. In anode output terminal 11 and the inlet and outlet tubes 9, 10 for the counting gas are located in another Lucite plate 6 which is attached to the plastic scintillator 2 through a packing 7 such as, for example, a vinyl packing, whereby easy light shielding of the scintillator is made possible. The size and shape of the plastic scintillator are chosen to give sufficiently large scintillation signals for cosmic ray $\mu$ mesons which pass through the G-M counter, so that the $\mu$ mesons are discriminated from $\beta$-rays emitted from commonly used isotopes. The minimum path length which the $\mu$ meson must traverse in the scintillator to trigger the G-M counter, is about 17 mm. except a small part near the anode supporter. This path length corresponds to an energy loss of about 3.5 mev., for the $\mu$ mesons. Any sample to be measured is introduced, by way of passage 8, into the lower part of the G-M counter. The detector assembly is put in a suitable shield chamber.

The associated electronic circuitry is shown schematically in FIG. 3, in which the circuit comprises a preamplifier 12, an amplifier 13, a high-voltage supply source 15, a discriminator 14, a differential discriminator 20, a multi-channel pulse height analyser 19, a high-voltage supply source 16, an amplifier 17, a discriminator 18, an anti-coincidence circuit 21, a coincidence circuit 22, and scalers 23, 24 and 25, which are connected to the device S such as shown in FIGS. 1 and 2. Arrows in the circuit designate the traveling directions of the signals at various parts.

In the above detector, since $\beta$-ray particles from a sample enter, through the G-M counter, into the plastic scintillator 2. These $\beta$-ray particles trigger both counters and give coincidence output signals. Accordingly, when the output signals of the scintillation counter are analysed by the pulse height selection in only the case wherein said coincidence output signals are produced, it is possible to obtain energy distribution of $\beta$-rays emitted from the sample.

On the other hand, since the background of the scintillation counter is produced by the hard component of cosmic rays and environmental $\gamma$-radiations and almost all parts of these backgrounds cannot be counted coincidentally in the G-M counter, the said background is reduced to an extreme degree when the above-mentioned coincidence counting is adopted.

Of course, the hard component of cosmic rays which have been passed through the G-M counter and the plastic scintillator produce coincidence outputs, but these outputs can be removed by the following method. That is, since cosmic rays lose energy of about 2 mev./cm. in the phosphor such as a plastic scintillator, the output signals due to cosmic rays can be made to be a sufficiently large signal, for example to be a value above 4 mev. by selecting the dimension of the phosphor so that all the rays passing through the G-M counter pass through at least a certain length such as 2 cm. of the phosphor, whereby said output signals can be efficiently distinguished from the β-rays having energy below about 2.5 mev. emitted from normal radioactive substances, by pulse height selection analysis.

According to the above-mentioned method, the background of the scintillation counter can be reduced greatly and energy analysis of β-rays being in a very low level can be made possible. According to experiments, in the energy range of 0.5–2.5 mev., the background count was reduced from about 5.4 counts per minute to about 0.14 count per minute.

The above description relates to the case of analysing the energy of β-rays, but the device can be applied to count β-rays having a certain energy range. One of the other applications is the case wherein the coincidence pulses between both the detectors are counted. A differential discriminator is used in the scintillation counter system to reject large pulses caused by cosmic rays or high energy γ-rays and undesirable small pulses including detector noises. In this case, the background becomes one obtained by removing the components due to the unnecessary energy components from the background of the G-M counter. According to experiments, in the measurement of $K^{40}$ (maximum energy of β-ray was 1.32 mev.), the background in energy range of 0.2–1.3 mev. was about 0.11 count per minute. In the conventional anti-coincidence counting, said background is about 0.8–1 count per minute. Another advantage of this method is that when a sample consisting of two or more different energy β-ray emitters is used, the selective counting of the high enregy component is made possible. This advantage has not yet been obtained by conventional methods.

Furthermore, since this method utilizes coincidence counting, erroneous counting due to such spurious operation of the G-M counter as "multiple discharge" does not occur.

The device of this invention can be effectively applied to measure β-rays having relatively low energy. In this case, the discriminator outputs of scintillation pulses are used to inhibit G-M pulses to be counted. If the discriminator is adjusted to pass only cosmic ray pulses, the background will be equivalent to that of the conventional low background counters, but by lowering the level of the discriminator the high energy component of the γ-ray background can be rejected also. By setting the discrimination level at 0.5 mev., a background of about 0.31 count per minute can be obtained.

As described above, by the use of the device of this invention, analysis and selection counting of the β-rays emitted from an extremely low level radioactive substance, which have been impossible by the conventional methods, are made possible. Accordingly, the invention is thought to have considerable usefulness in expanding the scope of utilization of and research on radioactive isotopes in such fields as medicine, agriculture, and engineering and in increasing precision in related measurements and utilizations. It is also considered to have important value in preventing radiation hazard.

What is claimed is:

1. A beta ray detector for use in the measurement of low level radioactivity of sample material, comprising a scintillation detector having a solid body of phosphor shaped to provide a hollow portion extending inwardly from one surface thereof, said scintillation detector being adapted to detect beta rays and to produce electrical pulses of amplitude related linearly to the energy of the beta rays striking said phosphor; a membrane closing said hollow portion, and means defining a sample-receiving chamber separated from said hollow portion by said membrane; and an ionization counter comprising anode and cathode electrodes and a sensitive gas volume all lying entirely within said hollow portion between said membrane and said phosphor body; the size and shape of said hollow portion being such that all mu mesons passing through said hollow portion from a sample in said chamber will travel through a predetermined thickness of said phosphor body whereby larger amounts of their energy are lost in said phosphor body than the maximum energy of beta rays to be measured; said membrane being of such thickness as to produce negligible energy loss in beta rays passing from the sample through the sensitive volume of said counter, and the cathode of said counter lying between its anode and the main body of said phosphor being opaque to visible light emitted by the discharge of said counter and being of such thickness as to allow beta rays passing through the sensitive volume of said counter to enter said phosphor body.

2. A beta ray spectrometer for analyzing and counting beta rays from sample material, comprising a beta ray detector as recited in claim 1, further including a photomultiplier tube associated with said body of said phosphor, a high voltage supply connected to said scintillation detector for supplying high voltage to the photomultiplier tube; a high voltage supply connected to said counter for supplying high voltage to said anode electrode, means for supplying counting gas to said counter; a pulse-height analyzer having a coincidence circuit connected to said scintillation detector and said counter for analyzing the electrical output pulses of the scintillation detector only when said pulses are coincident simultaneously with electrical output pulses of said counter so that the pulses of said scintillation detector caused by environmental beta and gamma rays are effectively removed and only the electrical pulses of said scintillation detector caused by beta rays and mu mesons from the sample passing through said sensitive volume of the counter are effectively analyzed according to their pulse-heights; and a recorder connected to said pulse-height analyzer for recording the output of said pulse-height analyzer to display the energy spectrum of beta rays separately from the mu meson background whose spectrum is displayed in a higher energy range than that of the beta rays.

3. A beta ray spectrometer for analyzing and counting beta rays from sample material, comprising a beta ray detector as recited in claim 1, further including a photomultiplier tube associated with said body of said phosphor, a high voltage supply connected to said scintillation detector for supplying high voltage to the photomultiplier tube, a high voltage supply connected to said counter for supplying high voltage to said anode electrode, means for supplying counting gas to said counter; an anti-coincidence device connected to said scintillation detector and said counter for counting the electrical pulses of said counter only when said pulses are not simultaneous with electrical pulses of said scintillation detector whose pulse-height is higher than a predetermined level, so that the electrical pulses of said counter caused by beta and gamma rays and mu mesons of higher energy than a predetermined energy level are effectively removed and only the electrical pulses caused by beta rays of lower energy than said energy level are effectively counted; and a scaler connected to said anti-coincidence device for registering the output thereof to display the count number of beta rays.

4. A beta ray detector in accordance with claim 1, in which said ionization counter is a G-M tube type counter.

5. A beta ray spectrometer in accordance with claim 2, in which said ionization counter is a G-M tube type counter.

6. A beta ray spectrometer in accordance with claim 3, in which said ionization counter is a G-M tube type counter.

References Cited by the Examiner

UNITED STATES PATENTS

| | | | |
|---|---|---|---|
| 2,855,520 | 10/1958 | Stoddard | 250—71.5 |
| 2,961,541 | 11/1960 | Ruderman | 250—71.5 |
| 3,090,866 | 5/1963 | Brammon | 250—71.5 |

FOREIGN PATENTS

| | | |
|---|---|---|
| 1,067,536 | 10/1959 | Germany. |
| 874,721 | 8/1961 | Great Britain. |

OTHER REFERENCES

Low Level Beta Counting, Nucleonics, vol. 16, No. 9, September 1959, pages 83 to 85.

RALPH G. NILSON, *Primary Examiner.*

J. W. LAWRENCE, *Assistant Examiner.*